J. A. SHINE.
Cotton-Planter and Fertilizer-Distributer.
No. 201,204.        Patented March 12, 1878.
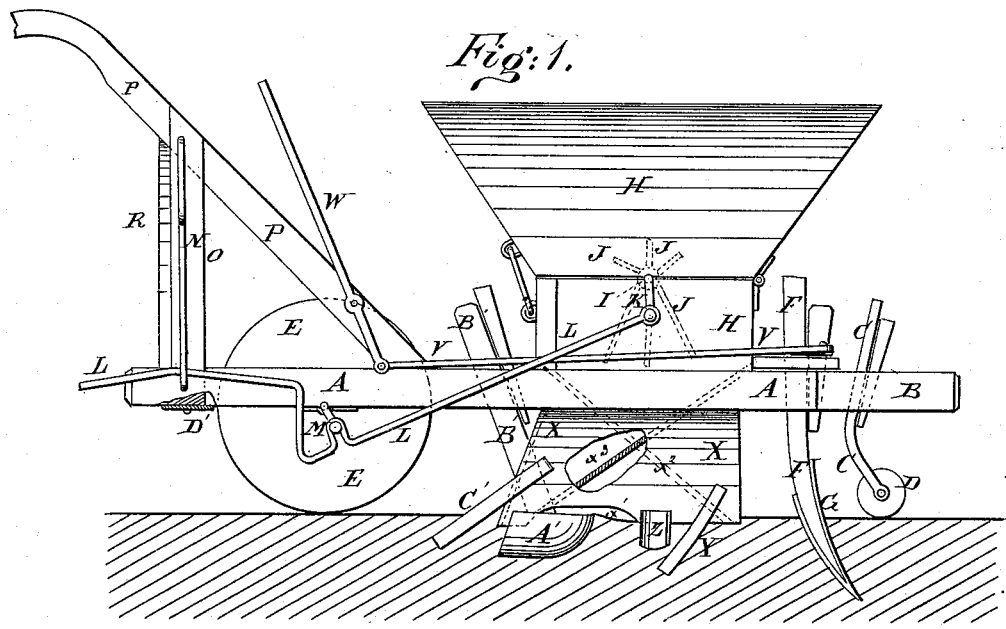
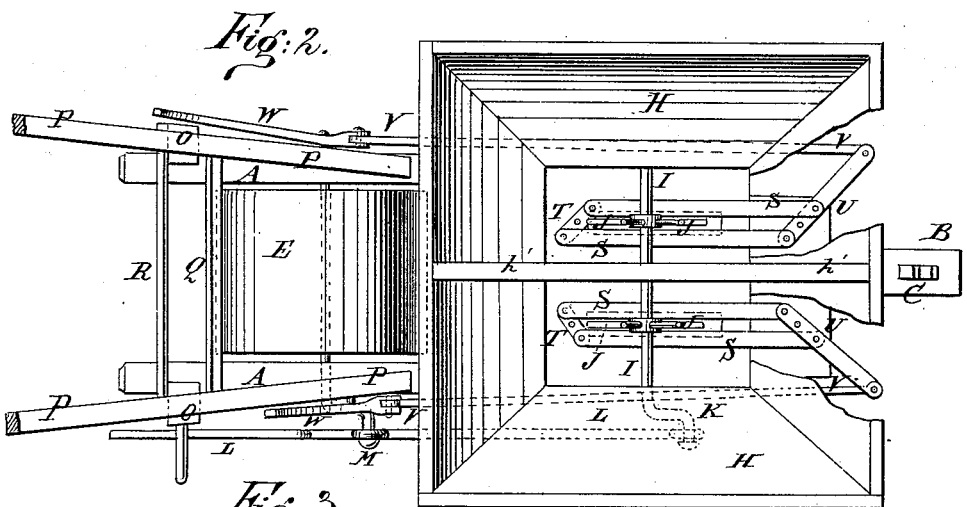
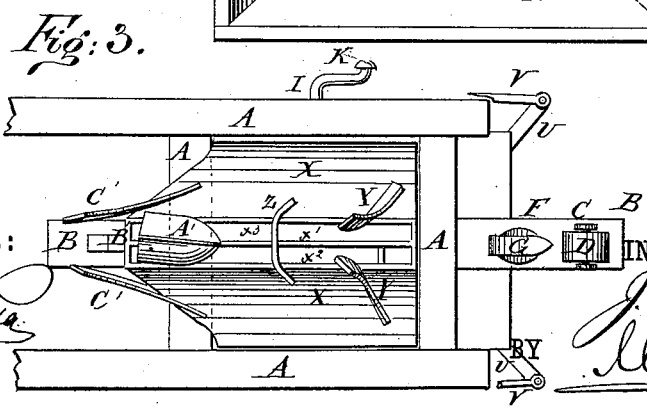
WITNESSES:
Chas. N____
C. Sedgwick
INVENTOR:
J. A. Shine
BY
____
ATTORNEYS.

UNITED STATES PATENT OFFICE.

JOSEPH A. SHINE, OF MOUNT OLIVE, NORTH CAROLINA.

IMPROVEMENT IN COTTON-PLANTER AND FERTILIZER-DISTRIBUTER.

Specification forming part of Letters Patent No. 201,204, dated March 12, 1878; application filed December 10, 1877.

*To all whom it may concern:*

Be it known that I, JOSEPH ALEXANDER SHINE, of Mount Olive, in the county of Wayne and State of North Carolina, have invented a new and useful Improvement in Cotton-Planter and Fertilizer-Distributer, of which the following is a specification:

Figure 1 is a side view of my improved machine, parts being broken away to show the construction. Fig. 2 is a top view of the same, parts being broken away to show the construction. Fig. 3 is a bottom view of the same.

Similar letters of reference indicate corresponding parts.

The object of this invention is to furnish an improved machine which shall be so constructed as to open a furrow, drop the guano into it, cover the guano with soil, open a second furrow, drop the seed into it, cover the seed with soil, and roll the soil above it, and which may be adjusted to regulate or stop the discharge of the guano and seed, either or both, as may be desired, and without stopping the machine.

The invention will first be described in connection with the drawing, and then pointed out in the claims.

A is the frame of the machine, to the middle forward part of which is attached the draw-bar B. The draw-bar B projects in front of the frame A, and to its forward part is attached the standard C, which is secured in place by a wedge-key or bolt, so that it may be readily adjusted as required. The lower part of the standard C is forked, and to it is pivoted a small wheel or roller, D, or to it is attached a board or rake, to serve as a gage to regulate the depth to which the opening-plows enter the ground. The rear part of the machine is supported by a roller, E, the journals of which work in bearings attached to the rear parts of the side bars of the frame A.

To the draw-bar B, a little in the rear of the standard C, is attached the standard F, which is secured in place by a wedge-key or bolt, so that it may be adjusted as required to cause the plow G, attached to its lower end, to open the ground to any desired depth to receive the guano or other fine fertilizer.

To the forward part of the frame A is attached the hopper H, which is divided into two compartments by a partition, $h'$, one of said compartments being intended to receive the guano, and the other to receive the seed. The hopper H is made in two parts, a lower rectangular part and an upper flaring part, which parts are hinged together at the adjacent edges of their forward ends, and are secured by a hook at their rear ends.

In the adjacent edges of the parts of the sides and of the partition of the hopper H are formed half-round notches, to serve as bearings for the shaft I, to which, within the compartments of the hopper, are attached radial fingers J, to keep the guano and seed stirred up, and to feed them out through the discharge-openings in the bottom of the said hopper. To one journal of the stirrer-shaft I is attached, or upon it is formed, a crank, K, to which is pivoted the forward end of the connecting-rod L. The rod L passes back along the side bars of the frame A, and has a loop or notch formed in it to receive the crank M, formed upon or attached to the journal of the roller E.

The crank M is made shorter than the crank K, so that the revolution of the roller E will only rock the stirrer I J. The rod L projects in the rear of the crank M, and passes through a long keeper, N, attached to the standard O, that supports the handle P, which keeper has a loop or notch formed in its upper part to receive and hold the rod L when raised from the crank M.

The forward ends of the handles P are attached to the side bars of the frame A, and the said handles are connected by a round, Q. The handles P and their supporting-standards O are strengthened by a brace, R, the lower end of which is attached to the lower part of one of the standards O, and its other end is attached to the upper part of the other standard.

The discharge-openings in the bottom of the hopper H are adjustable in size, the amount of guano and seed dropped being regulated by two parallel strips, S, placed over the side parts of each opening. The rear ends of the strips S are pivoted to the ends of a short strip, T, which is pivoted at its center to the bottom of the hopper H near the rear end of the said discharge-opening.

The forward ends of the strips S are pivoted to the strip U upon the opposite sides of, and equally distant from, the pivot, by which it is pivoted to the hopper-bottom at the forward end of the discharge-opening.

The outer ends of the strips U project, and to them are pivoted the forward ends of the connecting-rods V, which pass back along the sides of the lower part of the hopper H, and their rear ends are pivoted to the lower ends of the levers W. The levers W are pivoted to the lower parts of the handles P, and their upper ends project into such a position that they can be readily reached and operated by the plowman to regulate and stop the discharge, as required, without its being necessary to stop the machine.

To the bottom of the hopper H or to the frame A, beneath said hopper, is attached a wedge-shaped spout, X, which is divided longitudinally into two compartments by a vertical partition, $X^1$.

In the compartment of the spout X, beneath the guano-compartment of the hopper H, is secured a board, $x^2$, which inclines forward, to guide the guano to the discharge-opening at the forward lower corner of the spout X, and discharge it into the furrow opened by the opening-plow F G, close in the rear of the said plow. In the other compartment of the spout X, beneath the seed-compartment of the hopper H, is secured a board, $x^3$, which inclines to the rearward, to guide the seed to the discharge-opening at the rear lower corner of the spout X.

To the side of the spout X, a little in the rear of the forward discharge-opening, are attached two blades or teeth, Y, to loosen the soil at the sides of the furrow made by the opening-plow F G, so that the said furrow may be filled and the guano covered by the scraper or rake Z, attached to the spout X. The coverer Z may be attached at its ends to the lower ends of two rods extending upward and forward, and attached to the spout X or frame A, so that the said coverer may move up and down, to prevent trash from collecting upon it.

A′ is an opening-plow, placed in the rear of the scraper or rake Z, and a little in front of the rear discharge-opening, and which is secured to the lower end of the standard B′. The standard B′ is secured to the rear end of the draw-bar B by a wedge, key, or bolt, so that the opener A′ can be raised or lowered, to cause it to open a shallower or deeper furrow to receive the seed.

By this construction the guano and seed can each be deposited at any desired depth in the soil, or at the same depth, or with a layer of soil of any desired thickness between them.

To the rear lower part of the spout X are attached two blades or teeth, C′, to loosen the soil at the sides of the furrow, so that the seed may be covered and the soil pressed down upon it by the roller E.

To the rear part of the frame A is attached a plate, D′, to scrape off any soil that might adhere to the roller E and prevent its proper operation.

Having thus described my invention, I claim as new and desire to secure by Letters Patent—

1. The combination of the gage-fender C D, the forward opener F G, the forward blades or teeth Y, the coverer Z, the rear opener A′, and the rear blades or teeth C′, substantially as herein shown and described.

2. The combination, with hopper H, of two parallel end-pivoted strips, S, the short middle-pivoted strip T, and the strip U, pivoted at the forward end of the discharge-opening, and connected with hand mechanism, substantially as described.

3. The combination, with hopper H, of a longitudinally-divided wedge-shaped spout, X, having oppositely-inclined boards $x^2$ $x^3$, as and for the purpose specified.

JOSEPH ALEXANDER SHINE.

Witnesses:
 W. W. KORNEGAY,
 D. E. SMITH.